(12) United States Patent
Brown et al.

(10) Patent No.: US 7,198,145 B1
(45) Date of Patent: Apr. 3, 2007

(54) RELEASABLE CONNECTION FOR SORTATION CONVEYOR PUSHER

(75) Inventors: Allen Brown, Mason, OH (US); Martin Heit, Mason, OH (US); Justin Zimmer, Mason, OH (US)

(73) Assignee: Intelligrated, Inc., Mason, OH (US)

( * ) Notice: Subject to any disclaimer, the term of this patent is extended or adjusted under 35 U.S.C. 154(b) by 0 days.

(21) Appl. No.: 11/450,916

(22) Filed: Jun. 9, 2006

(51) Int. Cl.
*B65G 47/46* (2006.01)

(52) U.S. Cl. .............................. 198/370.02; 198/370.07

(58) Field of Classification Search ........... 198/370.02, 198/370.07
See application file for complete search history.

(56) References Cited

U.S. PATENT DOCUMENTS

| | | | | |
|---|---|---|---|---|
| 5,595,279 A * | 1/1997 | Wilkins et al. | ........ | 198/370.02 |
| 5,613,591 A * | 3/1997 | Heit et al. | ............. | 198/370.02 |
| 5,967,289 A * | 10/1999 | Kelsey | ................... | 198/370.02 |
| 5,971,135 A * | 10/1999 | Heinrich et al. | ......... | 198/487.1 |
| 5,992,644 A * | 11/1999 | Hannum | ...................... | 210/525 |
| 6,152,280 A * | 11/2000 | Bruun | .................... | 198/370.04 |
| 6,860,376 B1 * | 3/2005 | Heit et al. | ............. | 198/370.02 |
| 6,910,567 B2 * | 6/2005 | Van Den Goor | ....... | 198/370.02 |
| 7,007,538 B2 * | 3/2006 | Sofy | ........................ | 72/405.16 |
| 7,055,669 B2 * | 6/2006 | Veit | ....................... | 198/370.02 |

\* cited by examiner

*Primary Examiner*—Joe Dillon, Jr.
(74) *Attorney, Agent, or Firm*—Frost Brown Todd LLC

(57) ABSTRACT

A pusher has a retaining member disposed within an opening in the pusher cap, a fastening member secured to the pusher base and a fuse element interposes between the retaining member and the fastening member, the fuse element failing upon the application of an undesirable level of force to said pusher cap.

1 Claim, 5 Drawing Sheets

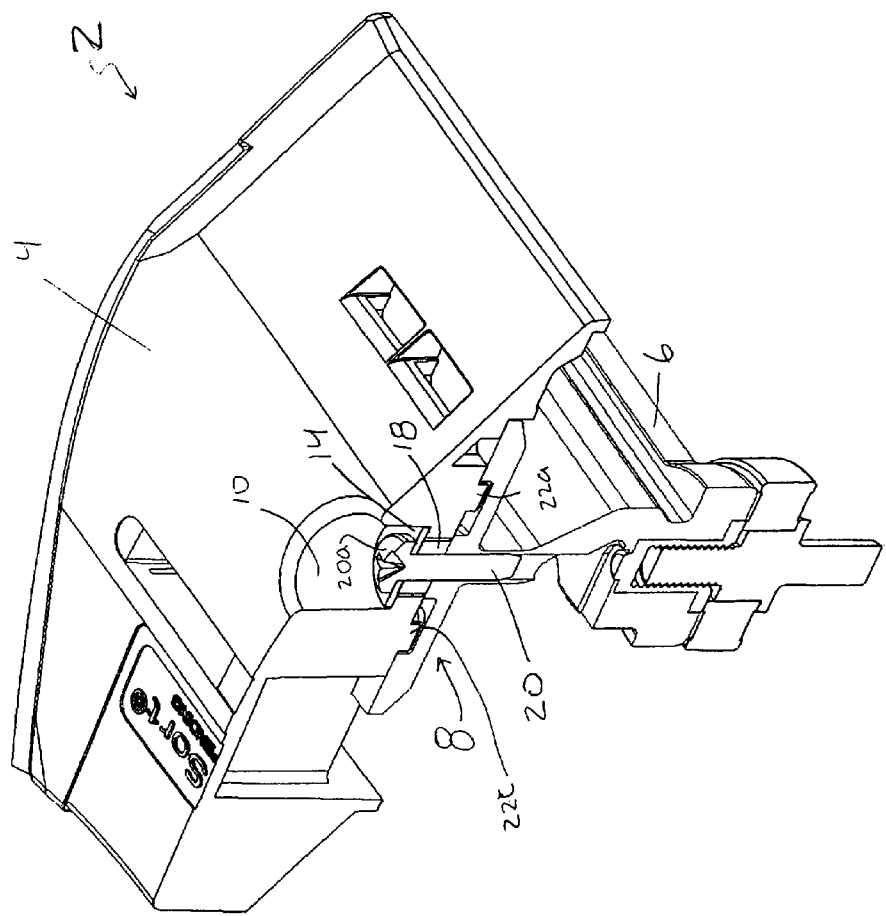
FIG. 2

RELEASABLE CONNECTION FOR SORTATION CONVEYOR PUSHER

TECHNICAL FIELD

The present invention relates generally to a pusher shoe assembly for a sortation conveyor, and more particularly to a releasable pusher shoe assembly. The invention will be disclosed in connection with, but not necessarily limited to, a fuse element retaining the pusher cap to the pusher base cap which permits the pusher cap to separate from the pusher base upon the application of a sufficient load.

BACKGROUND

Pusher shoe sortation conveyors are well known for directing articles on the conveyor to a desired path. In general, such sortation conveyors include a longitudinally moving endless conveying surface for carrying articles. Pusher shoes, also referred to as pushers or shoes, are carried by the conveyor, configured to be selectively directed to move across the lateral width of the sortation conveyor by actuation of a switch. The switch directs the pusher from a home path, along an outside edge of the sortation conveyor, onto a divert guide path underlying the conveying surface conveyor. The guide path, typically defined by a guide track, causes the pusher to move laterally so as to engage an article and divert it onto a spur conveyor.

Under certain circumstances, pushers may be subjected to an undesired level of force, such as might be applied to pusher cap during lateral divert of the pusher, which interferes with the desired travel of the pushers. In such instances, damage may occur to components of the conveyor, such as the guide tracks, switches, slats and pushers. A pusher which is configured for the pusher cap to separate from the pusher base upon the application of an undesired level of force can minimize or prevent damage to conveyor components.

U.S. Pat. No. 6,860,376, issued Mar. 1, 2005, U.S. patent application Ser. No. 10/800,070 filed on Mar. 12, 2004, and U.S. patent application titled Sortation Conveyor And Crossover Switch Therefor, inventor Justin Zimmer, filed Jun. 6, 2006, are hereby incorporated by reference.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

FIG. 2 is a perspective cross sectional view of the pusher of FIG. 1 taken along line 2—2 of FIG. 1.

FIG. 3A is an enlarged cross sectional view of the illustration within circle 3A of FIG. 3.

Figure 1:
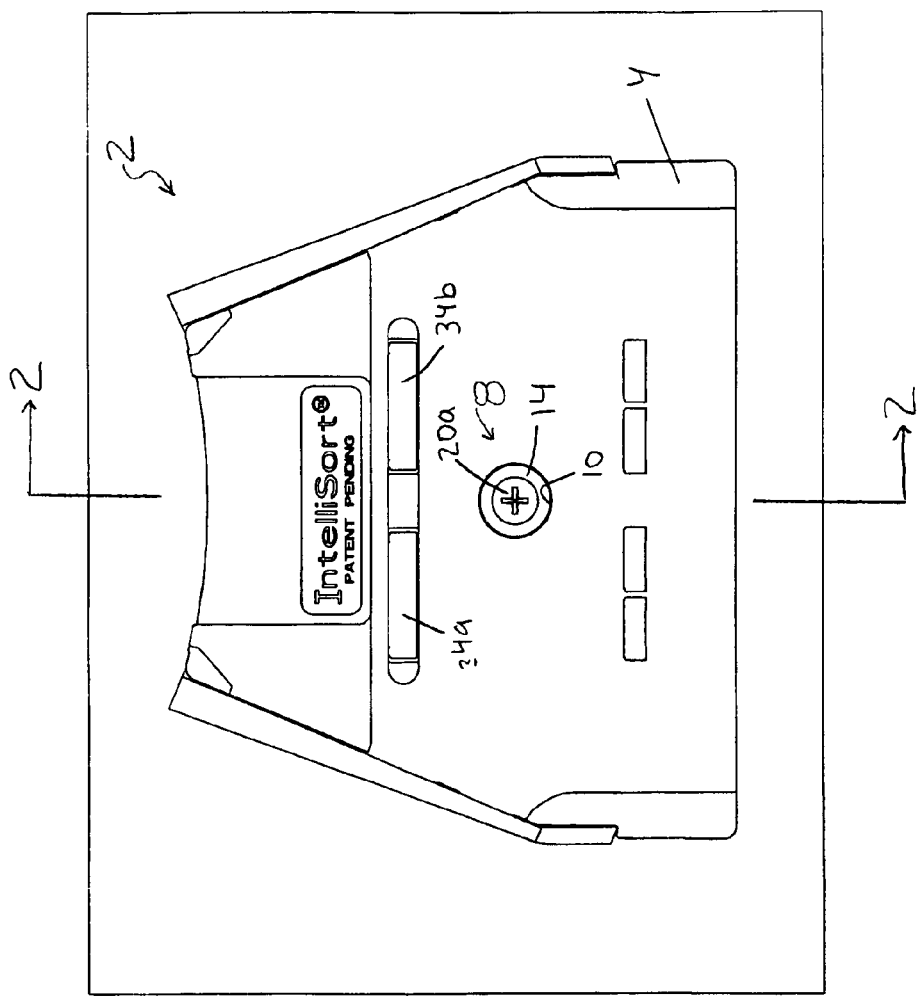
FIG. 1 is a top view of a dual sided pusher constructed in accordance with teachings of the present invention.
Figure 3:
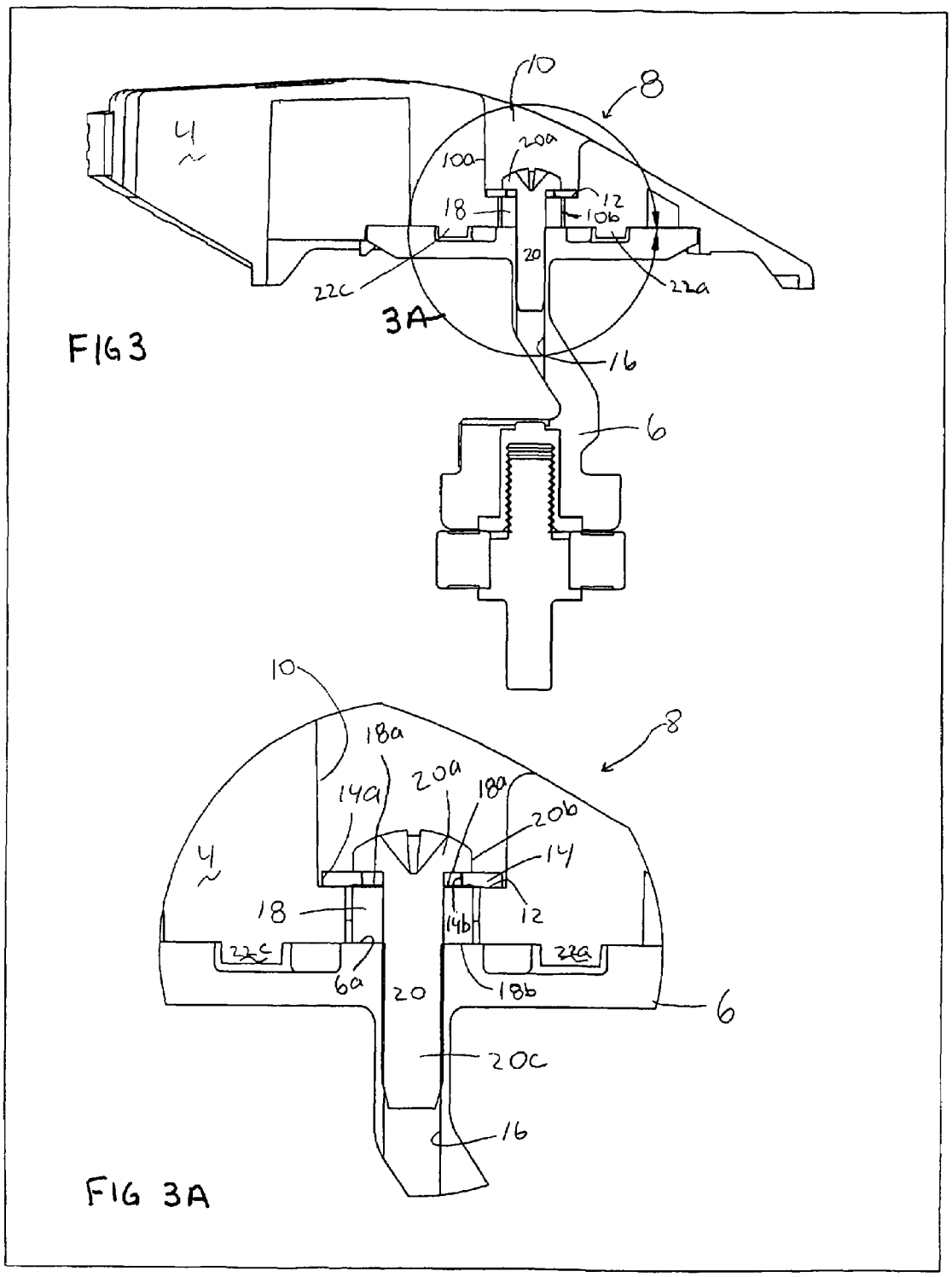
FIG. 3 is a side cross sectional view of the pusher of FIG. 1 taken along line 2—2 of FIG. 1.

Reference will now be made in detail to the present preferred embodiment of the invention, an example of which is illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. Referring in more detail to the drawings, an embodiment of the invention will now be described.

Referring to FIGS. 1, 2 3 & 3A, there is shown pusher, generally indicated at 2, configured as a dual sided pusher, although the teachings of the present invention may be applied to single sided pushers also. Pusher 2 comprises pusher cap 4 and pusher base 6, which may be made of any suitable material such as black Nylon ST (Super Tough). Pusher cap 4 and pusher base 6 may be of any configuration suitable to incorporate a releasable connection in accordance with teachings of the present invention.

Pusher cap 4 is releasably retained to pusher base 6 by connection 8. Connection 8 is configured to function as a mechanical fuse to allow pusher cap 4 to separate from pusher base 6 in the event an undesirable level of force is applied to pusher cap 4. In the embodiment depicted, pusher cap 4 includes opening 10 having retaining member 12. Retaining member 12 functions as a reaction member for fuse member 14, resisting relative movement of fuse member 14. In the embodiment depicted, retaining member 12 is configured as comprising annular surface between upper portion 10a of opening 10, having a larger diameter, and lower portion 10b of opening 10, having a smaller diameter. In the embodiment depicted, as a result of manufacturing processes, lower portion 10b includes draft in its upper wall section with the lower wall section being straight wall, with the intersection therebetween being illustrated as a horizontal line segment. Any suitable configuration of retainer member 12 may be utilized, such as a plurality of inwardly projecting members presenting a discontinuous annular land, providing resistance to relative movement of fuse member 14.

Pusher base 6 includes opening or bore 16, the center of which, when pusher cap 10 is disposed adjacent pusher base 6 in its proper location, is generally aligned with the center of opening 10.

Spacer 18 is disposed mostly within lower portion 10b, being shaped complementary thereto. With pusher cap 4 disposed atop pusher base 6 as shown, lower surface 18b of spacer 18 is adjacent and in contact with upper surface 6a of pusher base 6. In the embodiment depicted, spacer 18 is annular, with its outer diameter being slightly less than the inner diameter of lower portion 10b. Alternatively, the outer diameter could be sized to provide a press fit therebetween. Any suitable height and diameter dimensions will work. In the embodiment depicted, spacer 18 is made of Nylon 6/6, has a 0.500 inch diameter, and a 0.030 inch nominal clearance to lower portion 10b. Spacer 18 is 0.250 inches tall with lower portion 10b having a height of 0.243 inches.

Fuse member 14 is disposed adjacent and in contact with upper surface 18a of spacer 18. In the embodiment depicted, fuse member 14 is configured as a washer, and as such, outer peripheral surface 14a is a generally circular circumference, although any shape complementary to opening 10 may be used. In the embodiment depicted, outer peripheral surface 14a has a diameter slightly less than the inner diameter of upper portion 10a of opening 10, which allows fuse member to be easily located in opening 10 adjacent retaining member 12. In the embodiment depicted, outer diameter 14a is 0.750 inches, and the inner diameter of upper portion 10a is 0.781 inches, leaving a radial clearance of about 0.015 inches. The diameter of outer peripheral surface 14a is larger than the inner diameter of lower portion 10b. In the embodiment depicted, the inner diameter of lower portion 10b was about 0.558 inches, providing about a 0.096 inch radial overlap with retaining member 12. In the embodiment depicted, with pusher cap 4 disposed atop pusher base 6 as shown, there is about 0.007 inch clearance between retaining member 12 and the lower surface of fuse member 14. Within teachings of the present invention, this clearance may be greater, or zero (line to line). It may even be negative with spacer 18 being shorter than the height of lower portion 10b, preloading fuse member 14 against retaining member 12.

Fastening member 20 includes head 20a which is configured not to fit through the inner opening in fuse element 14. In the embodiment depicted, head 20a has circular circumferential surface 20b with about a 0.492 inch diameter and inner diameter 14b of fuse element 14 is about 0.390 inches, producing about 0.051 inches radial overlap.

Fastening member 20 includes body portion 20c which cooperates with bore 16 to secure fastening member to pusher base 6. In the embodiment depicted, fastening member 20 is a BosScrew from ITW Shakeproof 0.250–20×1.00 L. Body portion 20c has a nominal diameter of 0.250 inches providing clearance with disposed through the central hole of spacer 18, having an inner diameter of about 0.258 inches.

In the embodiment depicted, head 20a is drawn tight to clamp fuse element 14 and spacer 18 between head 20a and upper surface 6a of pusher body 6. It is this stackup which results in the 0.007 clearance between fuse element 14 and retaining member 12. Spacer 18 provides upper surface 18a against which head 20a clamps fuse element 14, to prevent head 20a from being rotated enough to pull head 20a through fuse element 14 (although over tightening of fastening member 20 could squeeze fuse element 14 out from between head 22a and surface 18a.

In the embodiment depicted, upon the application of an undesired level of force to pusher cap 4 will produce a separating force acting to separate pusher cap 4 from pusher base 6. This will result from retaining member 12 exerting an upward force against the lower surface of fuse element 14, and a resisting force exerted by head 20c down against the upper surface of fuse element 14. The components of connection mechanism 8 are dimensioned such that fuse element 14 yields to permit head portion to pass through the inner opening of fuse element 14 when the level of force reaches the design level-the desired level of force. In the embodiment depicted, fuse element 14 is made of Nylon 6/6, about 0.063 inches thick. Head 20c will be pulled through the central opening in fuse element 14, deflecting portions of fuse element 14, making spacer 18 and head portion 20c free to pass out through the bottom of opening 10, allowing separation of pusher head 4 from pusher base 6.

The components of connection mechanism 8 may be of any suitable dimensions and materials to permit separation. For example, fuse element 14 could be brittle instead of flexible, breaking upon the application of an undesired level of force, allowing spacer and head portion 20c to pass out of opening 10. Fuse element 14 could sufficiently flexible and there could be adequate clearance between the outer diameter of head 20c and the inner diameter of retaining member 12 to permit fuse element 14 to remain secured by fastening member 20 and pulled through lower portion 10b of opening 10. The level of force required to trigger connection mechanism 8 to allow separation can be increased or decreased by changing the dimensions of components, for example such as fuse element 14, fastening member 18, retaining member 12 or opening 10. Alternatively, fuse element 14 could replaced by a member (not shown) which does not act as the weakest link, and fastening member 20 could be configured to act as the fuse element, breaking or otherwise separating upon the application of an undesirable level of force.

Figure 4:
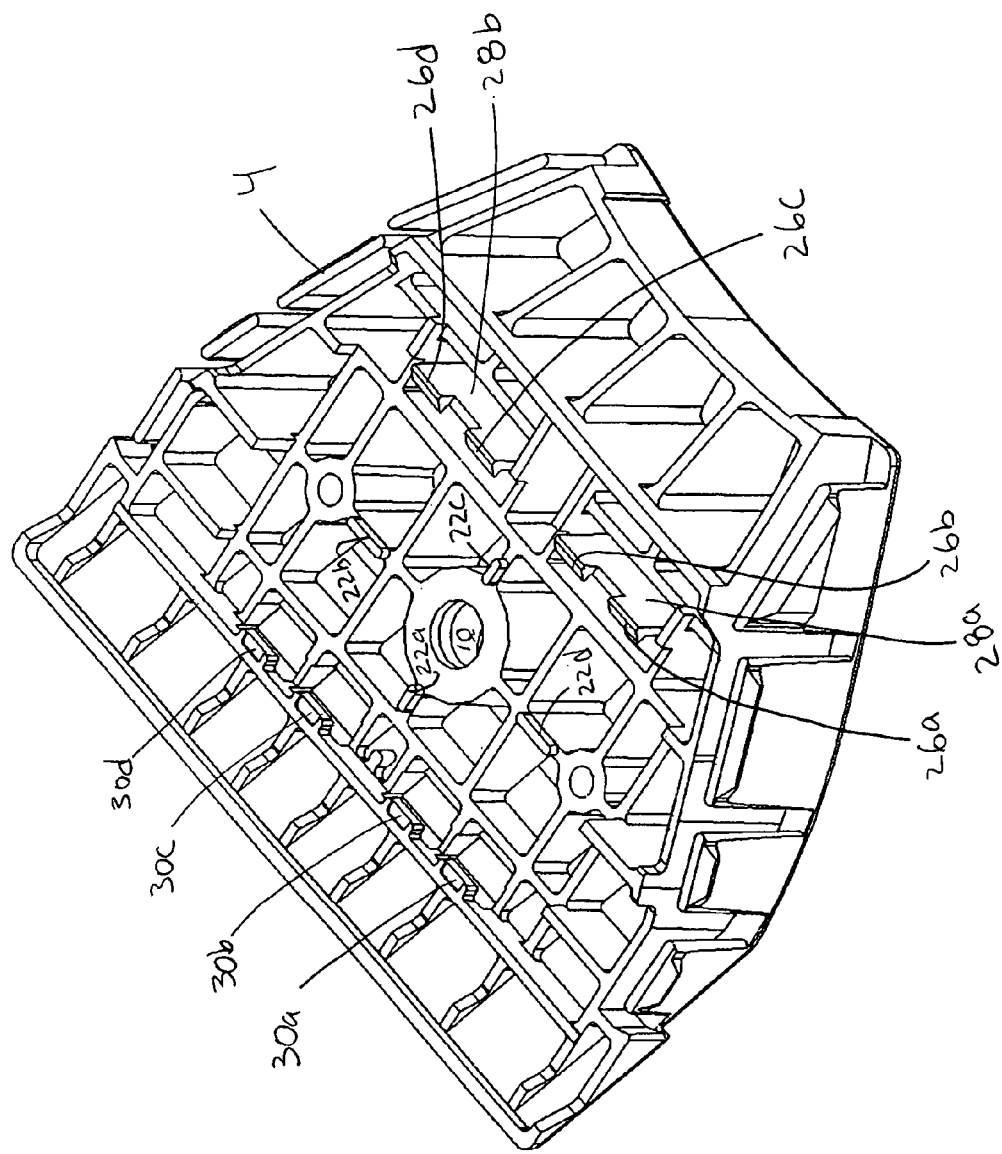
FIG. 4 is a bottom perspective view of the pusher cap of the pusher of FIG. 1, without the bumpers.
Figure 5:
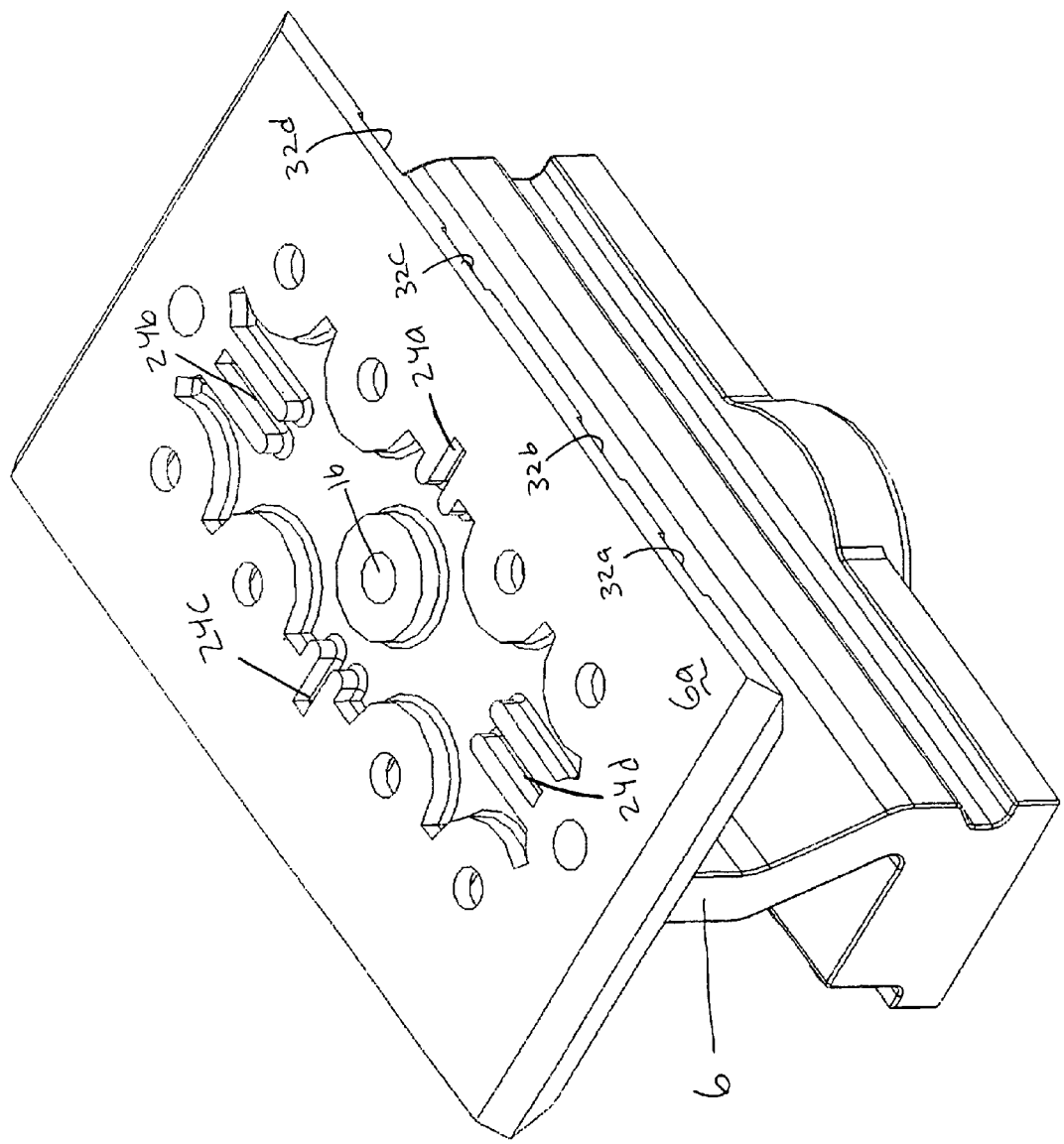
FIG. 5 is a top perspective view of the pusher base of the pusher of FIG. 1.

Although connection mechanism 8 releasably retains pusher cap 4 to pusher base 6, the first resistance to separation is from the mounting configuration between pusher cap 4 and pusher base 6. Referring to FIGS. 4 and 5, the bottom of pusher cap comprises a plurality of keys 22a, 22b, 22c and 22d extending therefrom. Keys 22a and 22c are disposed on the same axis, with keys 22b and 22d disposed on another axis at a right angle to the axis for keys 22a and 22c, with the axes passing through the center of opening 10. Although any suitable angle between axes may be used. In the embodiment depicted, keys 22a and 22c are about 0.089 inches to about 0.090 inches wide, about 0.390 inches long and about 1.15 inches center to center. Keys 22b and 22d are about 0.090 inches to about 0.093 inches wide, about 0.456 inches long and about 2.350 inches center to center.

Pusher base 6 includes corresponding keyways 24a, 24b, 24c and 24d carried by upper surface 6a. Keyways 24a and 24c are shaped and located complementary to keys 22a and 22c, and keyways 24b and 24d are shaped and located complementary to keys 22b and 22d. In the embodiment depicted, keyways 24a and 24c are about 0.093 inches to about 0.095 inches wide, and keyways 24b and 24d are about 0.100 inches to about 0.103 inches wide.

Keys 22a–22d and keyways 24a–24d help reduce concerns about fits up, shrink rates and the action of dual sided diverting moving pusher cap 4 back and forth on pusher base 6. These two sets of keys 22a and 22c, and 22b and 22d, and corresponding keyways 24a and 24c, and 24b and 24d, position and function to maintain the relationship between pusher cap 4 and pusher base 6.

The initial resistance to forces loading pusher 2 come from keys 22a and 22c. Additional resistance is provided by tabs 26a and 26b mounted on resilient arm 28a, and 26c and 26d mounted on resilient arm 28b, in conjunction with tabs 30a, 30b, 30c and 30d. When pusher cap 4 is assembled to pusher base 6, tabs 30a, 30b, 30c and 30d engage recesses 32a, 32b, 32c and 32d of pusher base 6, and tabs 28a, 28b, 28c and 28d engage similar complementarily shaped recesses (not seen). The amount of force exerted by tabs 26a–26d controls the grip of the tabs on pusher base 6. To increase the force exerted by resilient arms 28a and 28b through tabs 26a–26d, a resilient material, such as foam, may be placed into openings 34a and 34b. Any other suitable configuration may be used.

If the force applied to pusher cap 6 exceeds the restraining force of the keyways and tabs, connection mechanism 8 releasable retains pusher cap 4 to pusher base 6. Connection mechanism 8, keys and keyways, and tabs and slots may be utilized independently of each other, or in combination with any or all of each other.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims submitted herewith.

What is claimed is:

1. A connection for releasably retaining a pusher cap to a pusher base, said connection comprising:
    a. a retaining member carried by one of said pusher cap and said pusher base;
    b. a fastening member carried by the other of said pusher cap and said pusher base;
    c. a fuse element interposed between said retaining member and said fastening member;
    d. said retaining member, fastening member and said fuse element being dimensioned such that said fuse element fails upon the application of an undesirable level of force to said pusher cap, such that said connection mechanism ceases to hold said pusher cap to said pusher base.

* * * * *